(12) United States Patent
Liang et al.

(10) Patent No.: US 7,920,474 B2
(45) Date of Patent: Apr. 5, 2011

(54) SYSTEM AND METHOD FOR CONTEXT-BASED HIERARCHICAL ADAPTIVE ROUND ROBIN SCHEDULING

(75) Inventors: Victor K. Liang, Irvine, CA (US); Shiang-Feng Lee, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 419 days.

(21) Appl. No.: 11/868,906

(22) Filed: Oct. 8, 2007

(65) Prior Publication Data

US 2009/0092048 A1     Apr. 9, 2009

(51) Int. Cl.
*G01R 31/08* (2006.01)
*H04L 12/28* (2006.01)

(52) U.S. Cl. ........................................ 370/235; 370/412
(58) Field of Classification Search .................. None
See application file for complete search history.

(56) References Cited

U.S. PATENT DOCUMENTS

| | | | |
|---|---|---|---|
| 6,990,113 B1* | 1/2006 | Wang et al. | 370/412 |
| 7,457,241 B2* | 11/2008 | Basso et al. | 370/230 |
| 2005/0066053 A1* | 3/2005 | McDysan | 709/243 |
| 2007/0070907 A1* | 3/2007 | Kumar et al. | 370/235 |
| 2007/0121499 A1* | 5/2007 | Pal et al. | 370/230 |
| 2007/0153803 A1* | 7/2007 | Lakshmanamurthy et al. | 370/395.43 |
| 2007/0268823 A1* | 11/2007 | Madison et al. | 370/229 |
| 2008/0075003 A1* | 3/2008 | Lee et al. | 370/230 |
| 2008/0175270 A1* | 7/2008 | Kataria et al. | 370/468 |
| 2008/0228977 A1* | 9/2008 | Dignum et al. | 710/240 |
| 2009/0073884 A1* | 3/2009 | Kodama et al. | 370/235 |

OTHER PUBLICATIONS

Liang, A Simple and Effective Scheduling Mechanism using Minimized Cycle, 2002, IEEE.*
Kwon et al., "Scheduling algorithm for real-time burst traffic using dynamic weighted round robin", Proceedings of International Symposium on Circuits and Systems (ISCAS), pp. 506-509, May 1998.
Wang et al., "Adaptive-Weighted Packet Scheduling for Premium Service", Proceedings of IEEE International Conference on Communications (ICC), vol. 6, pp. 1846-1850, 2001.

* cited by examiner

*Primary Examiner* — Hong Cho
*Assistant Examiner* — Eunsook Choi
(74) *Attorney, Agent, or Firm* — Kenneth L. Sherman, Esq.; Michael Zarrabian, Esq.; Myers Andras Sherman & Zarrabian LLP

(57) ABSTRACT

A system and method which provides for efficient data transmission between multiple microprocessors in a computer system is disclosed. A physical data path is divided into a plurality connection queues. The connection queue size is compared to thresholds. Bandwidth allocation weights associates with the queues can be progressively refined based upon the comparison.

21 Claims, 10 Drawing Sheets

SYSTEM AND METHOD FOR CONTEXT-BASED HIERARCHICAL ADAPTIVE ROUND ROBIN SCHEDULING

BACKGROUND OF THE INVENTION

1. Field of the Invention

This application relates to enhancing data transmission. More particularly, this application relates to systems and methods which enhance data transmission rates by utilizing adaptive, weighted, hierarchical scheduling techniques.

2. Description of the Related Technology

Many computer systems include multiple data processors or processes which need to share information. For example, a system may include a large central processing unit which shares information with a less powerful secondary processor in the system that is used to perform certain specified tasks within the system. Data transmitted between the two processors typically is sent in a connection queue. Typically, the bandwidth and processor time available to the connection queue is limited, which means that when large amounts of data need to be transmitted between the processors, the data transmission may be delayed because the amount of data to be transmitted exceeds the available bandwidth. This delay is called data latency.

In many cases, some of the data to be transmitted between the processor has great significance and urgency, while other data is not as important. As a result, it is desirable to reduce the latency of important data, even if it means increasing the delay in transmitting the less important data. Various techniques for ensuring the prompt transmission of urgent and high priority data have been proposed. These techniques include utilizing weighted round robin scheduling algorithms to adjust bandwidth allocation weights based on current traffic conditions in the connection queue. However these techniques generally suffer from various shortcomings including the inability to provide proportional adjustment of queue size based on levels of traffic and the inability to reallocate bandwidth to significant service queues. Accordingly, it would be an advancement in the art to provide a scheduling and data queuing solution which addresses these and other shortcomings.

SUMMARY OF CERTAIN INVENTIVE ASPECTS

The systems and methods of the development disclosed herein each have several aspects, no single one of which is solely responsible for its desirable attributes. Without limiting the scope of this invention, several of its features will now be discussed briefly.

In a first embodiment, a multi-stage computer-implemented method of allocating bandwidth is provided. The method includes providing an allocation weight for each of a plurality of connection queues, wherein each of the connection queues is configured to transmit data, and generating a plurality of codebooks, wherein each of the codebooks corresponds to a stage of weight refinement. The method also includes modifying an allocation weight in a plurality of stages, wherein the modifying for each stage comprises determining weight refinement values from a codebook associated with the stage from the plurality of codebooks.

In another embodiment, a computer-implemented method of allocating bandwidth is provided. The method includes defining an associated threshold for each of a plurality of connection queues, wherein each of the plurality of connection queues is configured to transmit data. The method further includes determining a context vector associated with one or more connection queues selected from the connection queues, wherein each context element corresponds to a connection queue and is indicative of whether the size of its corresponding connection queue exceeds its associated threshold. Allocation weights are assigned to the selected connection queues based at least partly upon the determined context vector.

In another embodiment, a computer-implemented method of transmitting data from a processor is provided. The processor has a data path configured to transmit data from the processor. The method includes creating within the data path a plurality of connection queues, each connection queue being configured to transmit data and defining a first associated threshold for each of the connection queues. The method further includes comparing a size of a connection queue to its first associated threshold and determining a first allocation weight for each of the plurality of connection queues based upon the comparison of the size of the connection queue and its associated threshold.

In still another embodiment, a system for sharing data in a multi-processor environment is provided. The system includes a processor and a data path. The data path has a fixed bandwidth which comprises a plurality of connection queues defined therein. The bandwidth is allocated among the connection queues based on allocation weights assigned to each of the connection queues, which are at least partly determined based upon comparing thresholds associated with each of the connection queues to a size of the connection queues.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Various embodiments disclosed herein provide a system and method which provides for efficient data transmission between multiple microprocessors in a computer system. As used herein, a computer system refers to any type of device which uses microprocessors to process data. Computer systems may include personal computers, notebook computers, cable set top boxes, digital video recorders, mobile telephones, televisions, printing devices, multimedia players, or some other multi-processor device.

Figure 1:
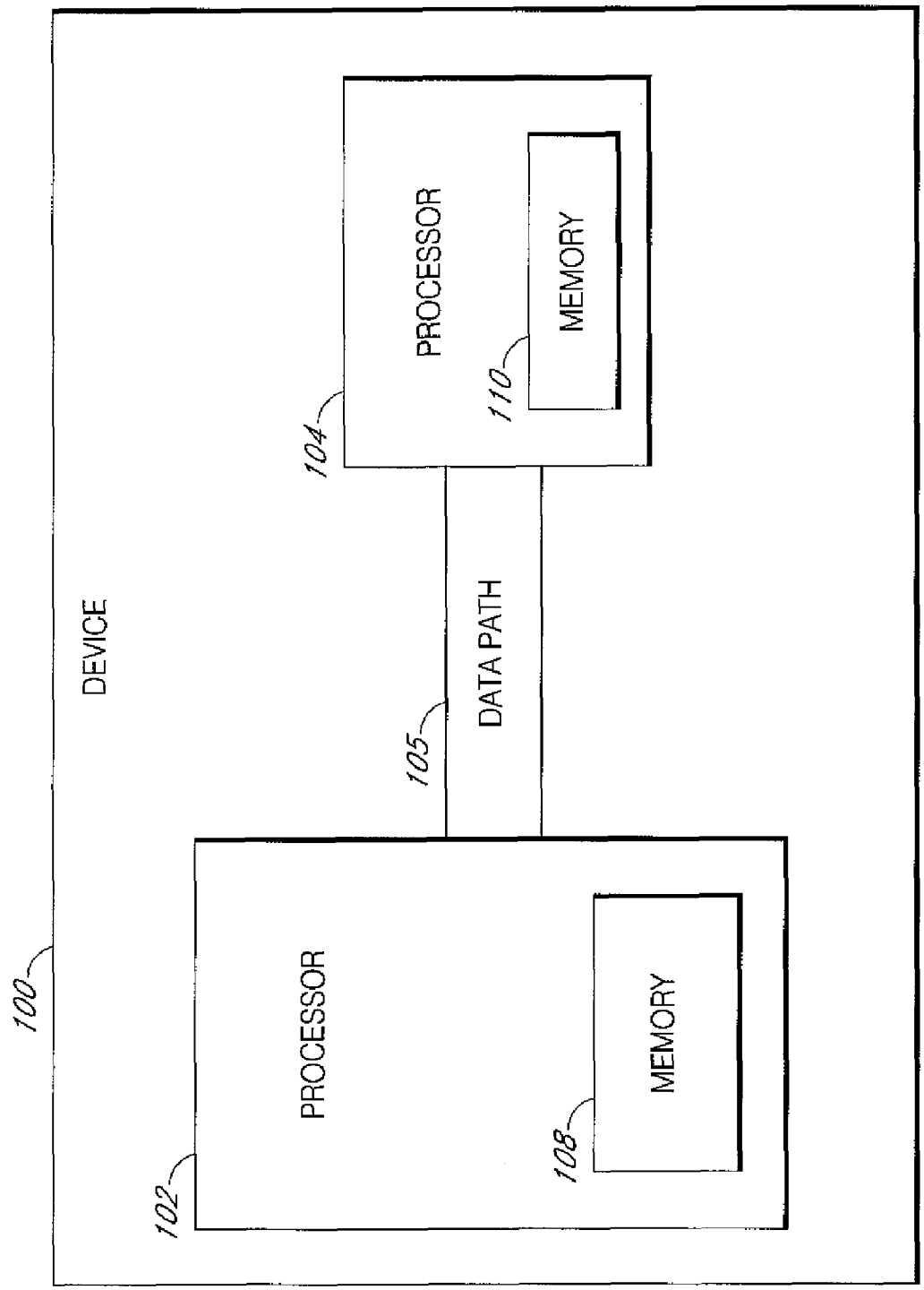
FIG. 1 is an example of a device suitable for the implementation of various embodiments.

FIG. 1 is an example of a device 100 suitable for the implementation of various embodiments that will be more fully described below. The device 100, which may be a computer system, includes a first processor 102. The first processor 102 may be a system processor such as a central processing unit which is used to help control the operation of the device by processing computer instructions and other data. The first processor 102 may include a memory 108. In some embodiments, the memory 108 may be an on board memory cache, or it may be some other type of memory which is able to store data to be processed by the processor.

The device 100 further includes a second processor 104. The second processor 104 may take various forms. In one embodiment, the second processor is a specialized processor which performs more limited duties than a central processing unit. The second processor 104 may be associated with a more peripheral function such as processing multimedia data, such as with a video card, a graphics card, or the like. The second processor 104 may also take the form of a smartcard or some other secondary processor in a set top box. In some embodiments, the second processor 104 may further include an onboard memory 110 which stores or caches data in such a way as to allow the processor faster access to that data.

Between the first processor 102 and the second processor 104 is a data path 105. The data path 105 is a physical connection which allows data to be transmitted from the first processor 102 to the second processor 104. The data path 105 may be in the form of dedicated wire(s) having a fixed bandwidth. Alternatively, the data path 105 may be an allocated or dedicated portion of a wider data channel which permits two way transmission of data between the first processor 102 and the second processor 104. The data path may take other forms.

According to various embodiments, the data path 105 may be dynamically divided into one or more connection queues which are prioritized with different allocation weights by a scheduler, such as a round robin scheduler, for example. The allocation weight relates to the amount of processor time allocated to the queue, such that data may be efficiently transmitted based on the priority of the data and the allocation weight of the queue. In some embodiments, the second processor 104 has limited processing power and a low bandwidth of interface as compared to the first processor 102. As a result, data sent from the first processor 102 to the second processor may exceed the interface bandwidth of the second processor 104 with the first processor 102. When this occurs, portions of the incoming data may be queued or delayed until the second processor 104 has available capacity to handle those portions of the incoming data.

Figure 2:
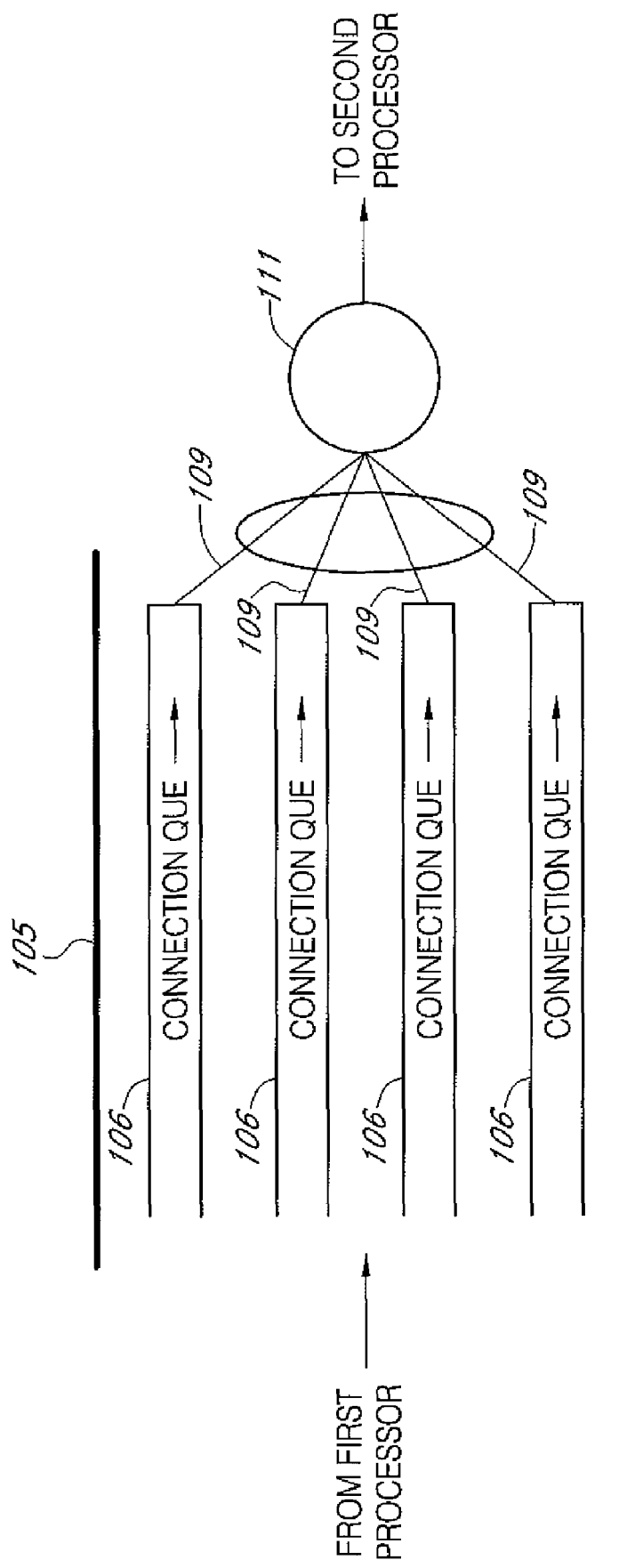
FIG. 2 is a diagram illustrating the configuration of the data path from FIG. 1.

Referring now to FIG. 2, a diagram showing a more detailed example of a data path 105 is provided. As shown in the figure, the data path 105 may be divided into one or more connection queues 106. The connection queues 106 may comprise virtual connections through which data is transmitted from the first processor 102 to the second processor 104. As used herein, a virtual connection refers to any data connection between two entities. The connection queues 106 may be data structures which manage the transmission of data through the data path 105.

The connection queues 106 are typically in communication with a scheduling module 111 which is used to allocate resources of the second processor 104 among the respective connection queues 106. The scheduling module 111 may take the form of software stored on one of the processors 102 or 104 in memory 108 or 110. Alternatively, the scheduling module 111 may be hardware based and implemented an application specific integrated circuit (ASIC). As noted above, the scheduling module 111 may be a round robin scheduler. Alternatively, it may take the form of a fair-queuing scheduler, a proportionally fair scheduler, a maximum throughput scheduler, or some other scheduler known in the art.

In some embodiments, the connection queues 106 are implemented as a linked list data structure. Alternatively, the connection queues 106 may be some other form of data structure, such as an array for example. As will be discussed in further detail below, an allocation weight may be associated with a connection queue 106, and the allocation weight may be adaptively modified. In order to determine an allocation weight modification, one or more thresholds may be defined. Each threshold may indicate a size of data awaiting transmission over its respective connection queue 106. One or more thresholds may be defined for a connection queue 106, and the thresholds may be based on a variety of factors such as a transmission latency for the connection queue 106, a priority for the data sent through the queue 106, a total size of data to be transmitted across the connection queue, or some other factor.

Figure 3:
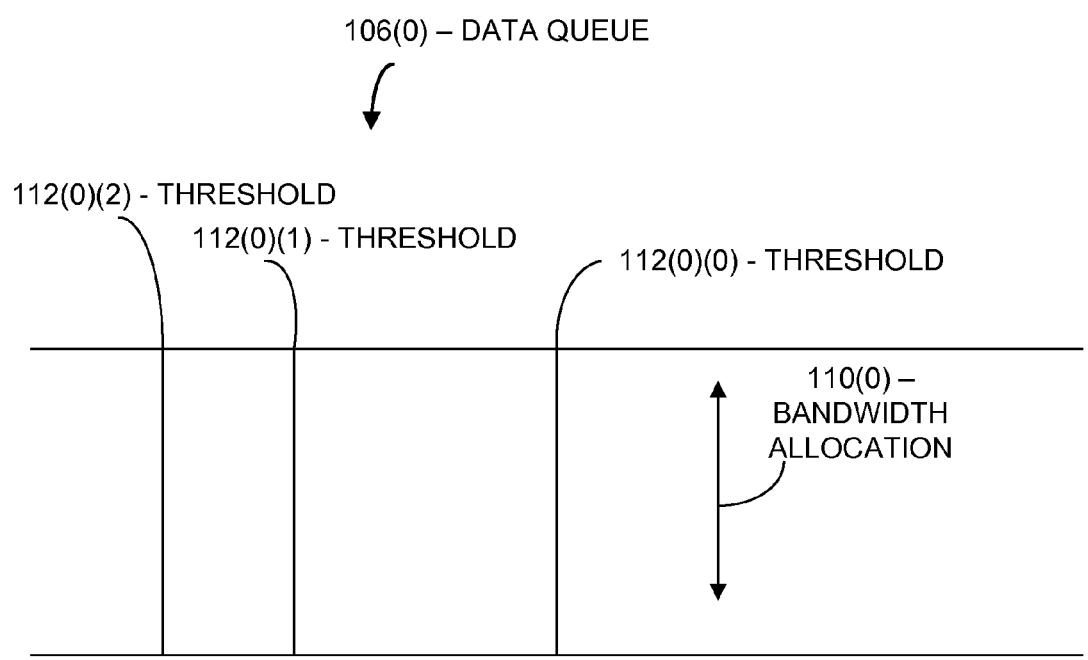
FIG. 3 is a block diagram of a connection queue and its associated thresholds.

Referring now to FIG. 3, an example of a connection queue 106 is provided. As there may be multiple connection queues 106 having multiple thresholds 112 in a given device 100, for ease of reference, different connection queues 106 (and their associated subcomponents) will be called out herein with a sub-identifier such as connection queue 106($n$), where n is an integer. As shown in FIG. 3, a connection queue 106(0) is characterized by a bandwidth allocation 110(0). The bandwidth allocation 110(0) is a measurement of the portion of data path 105 bandwidth made available to this particular connection queue 106(0). In some embodiments, the bandwidth allocations for each of the connection queues 106 are the same. In other embodiments, the bandwidth allocations may be variable between different connection queues 106. For example, a first connection queue 106(0) may have a bandwidth allocation 113(0) of 578 bytes. A second connection queue 106(1) may have a different bandwidth allocation 113(1) such as 978 bytes, for example. As noted above, connection queues 106 may also include one or more thresholds 112. As is discussed in detail below, the thresholds 112 are used to determine when, if, and/or the extent to which to modify an allocation weight associated with a connection queue 106. In the example provided in FIG. 3, the connection queue 106(0) has three defined thresholds 112(0)(0), 112(0)(1), 112(0)(2). Each threshold conceptually represents an amount of data awaiting transmission by the queue (a connection queue size). The threshold may be a connection queue size and/or a data size. The threshold may be a particular data characteristic or element. For example, if a specific data feature is known to occur ⅕ of the way through a connection queue, identifying whether the specific data feature continues to await transmission or whether it has already been transmitted can indicate information regarding the size of the data still awaiting transmission. The threshold may be a fraction or percentage. For example, the threshold may indicate ⅕ of the total data to be transmitted by the connection queue continues to await transmission.

In certain embodiments, an initial threshold (such as threshold 112(0)(0) shown in FIG. 3) may be used to compute additional thresholds associated with a connection queue (such as connection queue 106(0)). Each additional threshold, such as threshold 112(0)(1) and threshold 112(0)(2) for example, may have a linear or non-linear relationship with the initial threshold 112(0)(0). In implementation of a relationship between thresholds, an alpha (α) value may be defined. In some instances, an exponential formula may be used. In these instances the α value may be set to a value of ½. Thus if the initial threshold 112(0)(0) in connection queue 106(0) is set to 512 bytes, the next threshold 112(0)(1) may be defined as 512 bytes+½*512 bytes. Additional thresholds may be defined similarly according to the equation:

$$\text{Threshold}(n) = \sum_{i=0}^{n-1} \alpha^i \cdot \text{Threshold}(0)$$

Figure 4:
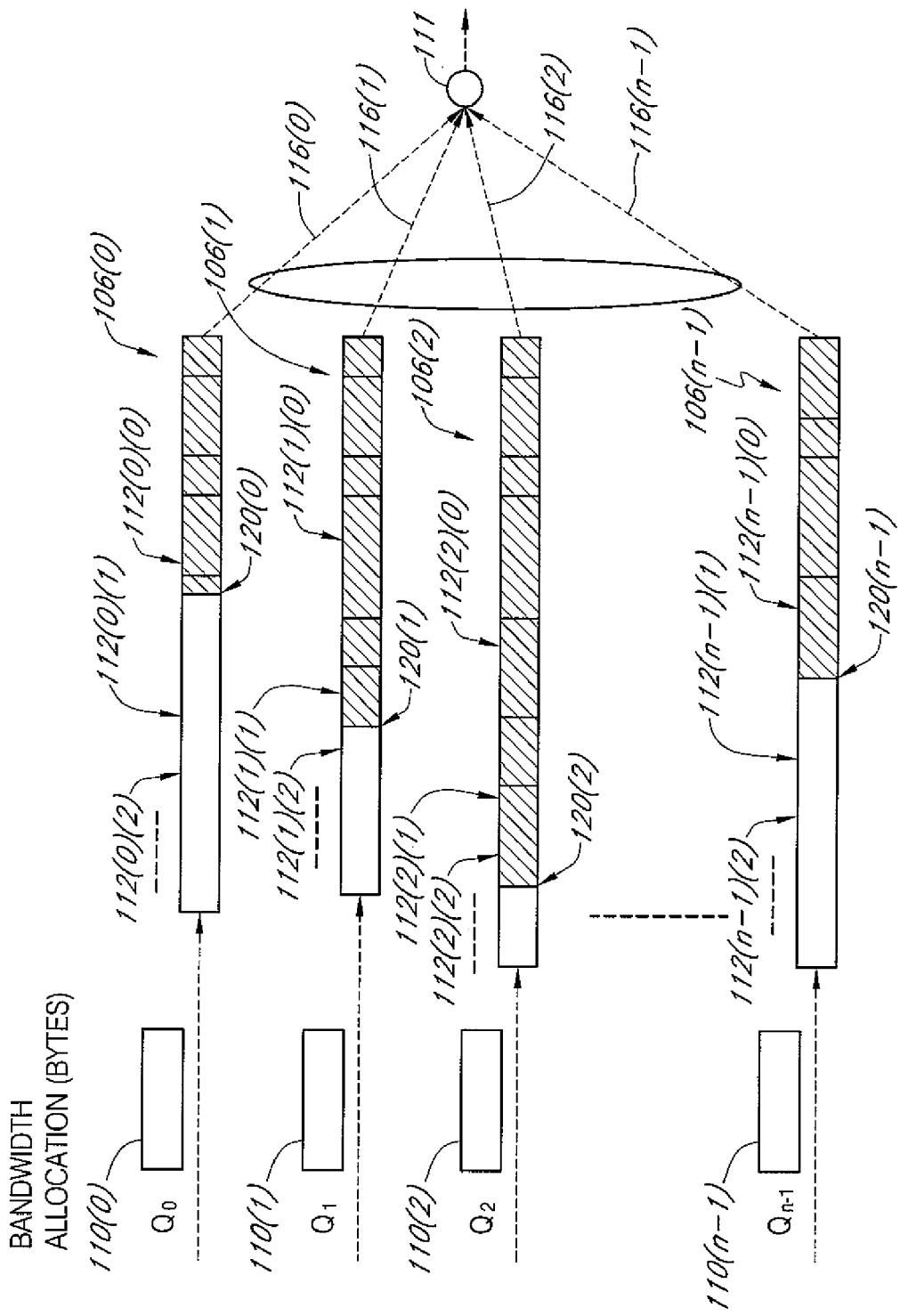
FIG. 4 is a block diagram of a plurality of queues and associated thresholds.

Referring now to FIG. 4, an example of a plurality of connection queues 106(0), 106(1), 106(2), ... 106(n−1), each characterized by a bandwidth allocation 110(0), 110(1), 110(2), ... 110(n−1), is provided. Further, each of the connection queues 106(0), 106(1), 106(2), ... 106(n−1) is characterized by a connection queue size 120(0), 120(1), 120(2), ... 120(n−1). The queue size 120 may include one or more data packets. Each of the connection queues may be configured to carry the same or different types of data. In the instance of FIG. 4, three thresholds 112 are associated with each of the plurality of connection queues 106(0), 106(1), 106(2), ... 106(n−1). For each queue, it can be determined whether the queue size 120 exceeds one or more of the thresholds 106. For example, for connection queue 106(0), the queue size 120(0) exceeds the first threshold 112(0)(0) but not the second and third thresholds 112(0)(1) and 112(0)(2). Additionally, in this instance, the thresholds associated with any given connection queue 106 differ from the thresholds 112 associated with another given connection queue 106. For example, compare 112(0)(0), 112(0)(1) and 112(0)(2) to 112(1)(0), 112(1)(1) and 112(1)(2). In other instances, one or more of the thresholds 112 may be substantially the same across two or more connection queues 106. Thresholds 112 may be set according to one or more priorities of the connection queues. Connection queues 106 of high priorities may have short thresholds 112 relative to the thresholds 112 of other connection queues 106. For example, in the example of FIG. 4, connection queue 106(2) may carry a lower priority between the first processor 102 and the second processor 104 than the connection queues 106(0), 106(1) and 106(n−1), as the thresholds 112(2)(0-2) are higher than the respective thresholds 112(0)(0-2), 112(1)(0-2) and 112(n−1)(0-2). The higher priority data to be sent over the first connection queue 106(2) may take the form of key data which may be used to descramble video sent from a first processor 102 to the second processor 104. The lower priority data to be sent over the remaining connection queues may include firmware downloads or housekeeping data.

Each of the connection queues 106 is associated with an allocation weight 116, wherein the allocation weights 116 may be managed by the scheduling module 111. The scheduling module 111 may preferentially allocate bandwidth for transmission of connection queues 106 associated with large allocation weights 116. In order to ensure that the urgent data has sufficient quality of service, higher allocation weights 112 may be assigned to connection queues of higher priority. The allocation weights 116 may be adaptable, as described in greater detail below. In some embodiments, the allocation weights 116 are normalized, while in other embodiments, they are not. Normalization can include instances in which each allocation weight 116 is restricted to a range defined by a maximum value (e.g., 1) and a minimum value (e.g., 0) or instances in which the sum of the allocation weights 116 across all connection queues 106 sum to a constant value (e.g., 1). The allocation weight 109 for a given connection queue 106 may be a percentage of the interface bandwidth of the second processor 104 allocated to that connection queue.

Figure 5:
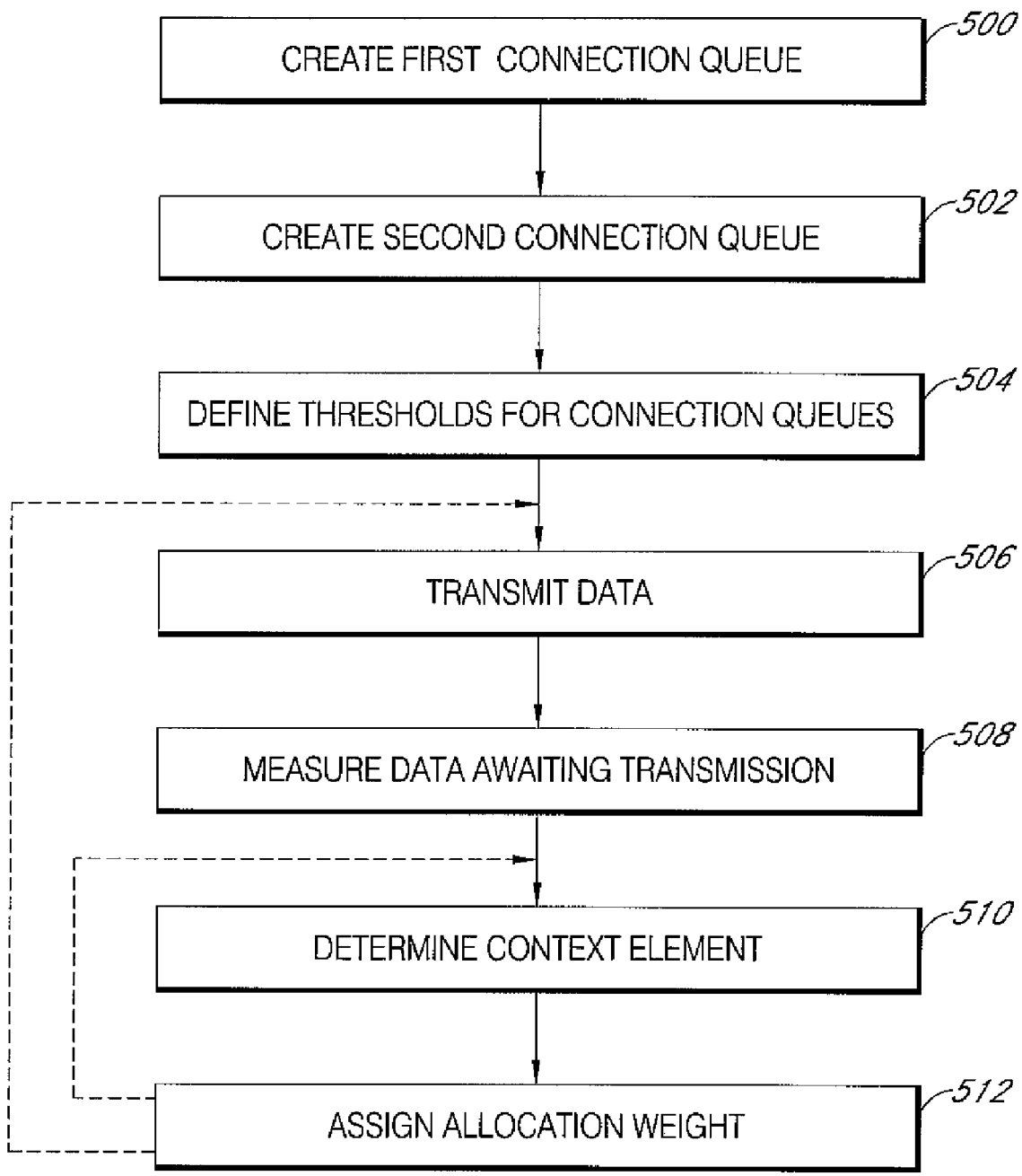
FIG. 5 is a flowchart showing a method of providing inter-processor communication on a channel between a first processor and a second processor.

As discussed previously, one or more embodiments provide for a process by which inter-processor communication is provided on data path between a first processor and a second processor. FIG. 5 is a flowchart of describing one exemplary embodiment. The process begins at block 500, where a first connection queue is created between the first processor and the second processor. Next at block 502, a second connection queue is created between the first processor and the second processor.

Next, at block 504, one or more thresholds 112 are defined for each of the first and second connection queues. Important and urgent data may be sent through the first connection queue, while less important data may be sent through the second connection queue. In this instance, the one or more thresholds 112 defined for the first connection queues may be less than the thresholds 112 defined for the second connection queue. A set of thresholds 112 may be defined for a connection queue:

$$T_{j,k} = [T_{j,0} T_{j,1} T_{j,2} \ldots T_{j,M-1}]$$

In some embodiments, for which the same number of thresholds is defined for each connection queue, a set of masks, $V_0, V_1, V_2, \ldots, V_{M-1}$, is defined, wherein M is the number of thresholds per connection queue. Each mask V comprises a vector consisting of the thresholds of a certain level across all connection queues:

$$V_k = [T_{0,k} T_{1,k} T_{2,k} \ldots T_{N-1,k}],$$

wherein N is the number of connection queues. For example, $V_0$ is a vector comprising the initial thresholds $T_{j,1}$ of all connection queues. $V_1$ is a vector comprising the second thresholds $T_{j,1}$ of all connection queues. Therefore, all thresholds for all connections can be represented as shown:

$$T = \begin{bmatrix} T_{0,k} \\ T_{1,k} \\ T_{2,k} \\ \ldots \\ T_{N-1,k} \end{bmatrix}$$

$$= \begin{bmatrix} T_{0,0} & T_{0,1} & T_{0,2} & \ldots & T_{0,M-1} \\ T_{1,0} & T_{1,1} & T_{1,2} & \ldots & T_{1,M-1} \\ T_{2,0} & T_{2,1} & T_{2,2} & \ldots & T_{2,M-1} \\ \ldots & \ldots & \ldots & \ldots & \ldots \\ T_{N-1,0} & T_{N-1,1} & T_{N-1,2} & \ldots & T_{N-1,M-1} \end{bmatrix}$$

$$= [V_0 \ V_1 \ V_2 \ \ldots \ V_{M-1}]$$

At block 506, data is transmitted by the connection queues. In some embodiments, data is transmitted by both of the connection queues. In other embodiments, data is transmitted only by one of the connection queues. At block 508, the connection queue size and/or the accumulated data awaiting transmission by one or more of the connection queues is measured. Connection queue size may include one or more packets of data. The measurement includes any such measurement that can be used to determine a connection queue size. For example, the measurement may independently identify the size of the data awaiting transmission, may cumulatively track the data size awaiting transmission as the connection queue transmits data, or may determine whether a particular data component remains to be transmitted. The measurement may comprise a fraction or percentage, such as a fraction of accumulated data that remains to be transmitted. The measurement may be determined by summing the length of packets that await transmission. This calculation may occur each time a new packet is sent by the queue. Alternatively, an exponential moving average (EMA) may be utilized to determine a data size. The EMA may be calculated according to the equation $$\overline{q}(t) = \frac{q(t) + (1-\beta)q(t-1) + (1-\beta)^2 q(t-2) + (1-\beta)^3 q(t-3) + \ldots}{1 + (1-\beta) + (1-\beta)^2 + (1-\beta)^3 + \ldots}$$

$$= \beta \cdot q(t) + (1-\beta) \cdot \overline{q}(t-1)$$

EMA, sometimes also called an exponentially weighted moving average (EWMA), applies weighting factors which decrease exponentially as shown in the above equation. EMA gives a more accurate estimate of the data size, by giving more importance to recent observations while not discarding older observations entirely. In the above equation, each entry q(t) represents the connection queue time at a specific time t. $\overline{q}(t)$ present the EMA of the connection queue size at time t. The degree of weighing decrease is expressed as a constant smoothing factor $\beta$, a number between 0 and 1. The larger value of $\beta$ makes the measurement adapt more rapidly to the instantaneously data input.

At block 510, a context element is determined. The context element may be determined by comparing the measured or estimated queue size to a threshold. The context element may indicate whether a connection queue size exceeds a threshold. In some embodiments, a context vector is associated with a connection queue, wherein the context vector includes a plurality of context elements corresponding to a plurality of thresholds associated with a specific connection queue. In one embodiment, N defines the number of connection queues and M defines the number of thresholds associated with a connection queue. The context vector may be defined for each connection queue as:

$$C_k = \lfloor c_{k,j} \rfloor = \lfloor c_{k,0} c_{k,1} c_{k,2} \ldots c_{k,N-1} \rfloor; k=0,1,2,\ldots,M-1,$$
$$j=0,1,2\ldots N-1,$$

wherein $c_{k,j}$ is a binary context element that relates a queue size q to a threshold T. For example:

$$c_{k,j} = \begin{cases} 0; & \text{if } q_j < T_{j,k} \\ 1; & \text{if } q_j \geq T_{j,k} \end{cases}$$

At block 512, an allocation weight is assigned. The allocation weight may be determined based upon a context element, a plurality of transmission indicators associated with the same and/or different connection queues, a context vector, or a plurality of context vectors. In some embodiments, the assignment of the allocation weight comprises modifying an existing allocation weight. The existing allocation weight may be modified by using a code book, indicating an amount by which the allocation weight should be modified. Further detail regarding assignment of an allocation weight is described below.

In some embodiments, the process continues by returning to block 510. In these instances, the connection queue size may be compared to another threshold for the queue, or the queue size of a plurality or queues may be compared to thresholds from another mask V. Therefore, the process of FIG. 5 may be characterized as a multiple-stage and/or a progressive process. In some embodiments, the process continues from block 512 by returning to block 506.

Figure 6:
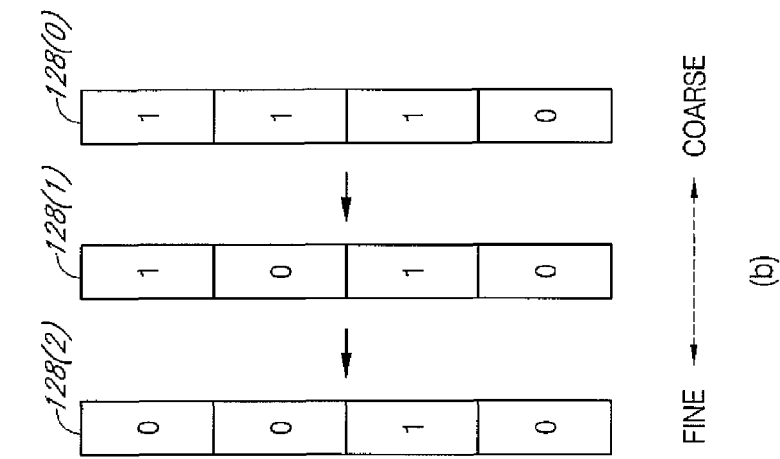
FIG. 6 is a block diagram of a plurality of queues and associated thresholds and the associated context vectors.
Figure 6:
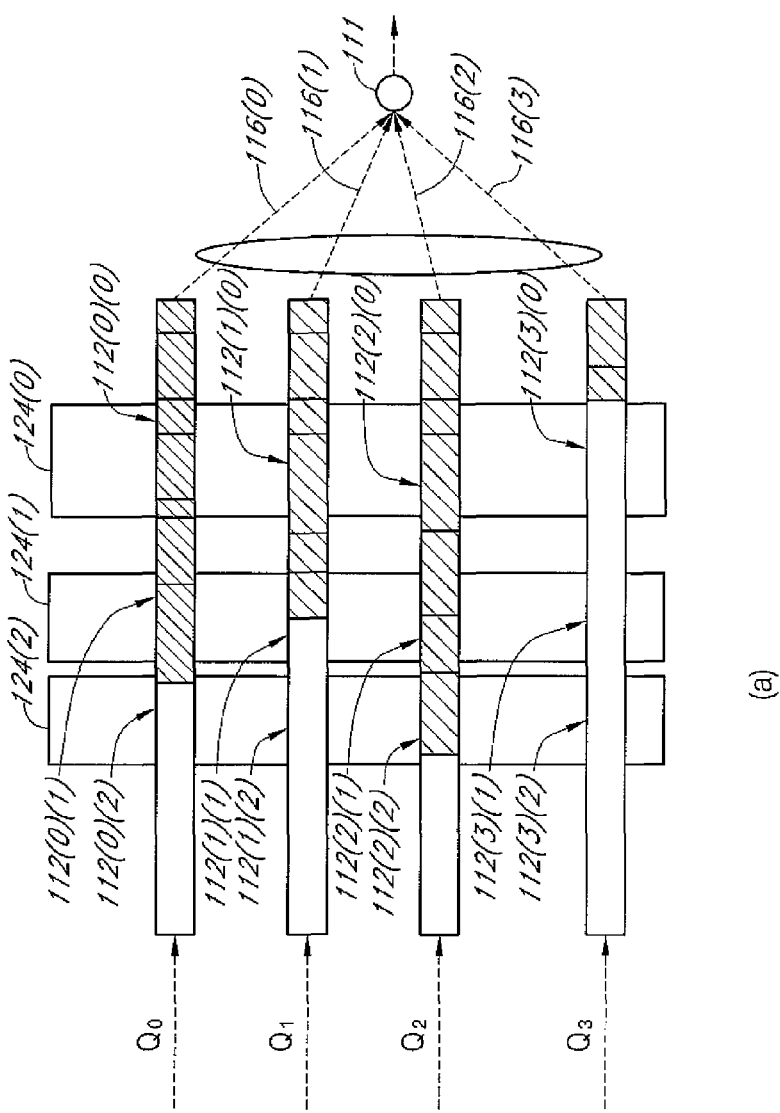

FIG. 6 shows an example for a system comprising four connection queues and three hierarchies, corresponding to three masks 124(0), 124(1) and 124(2). Each mask 124(k) includes a threshold for each of the connection queues, 112(0)(k), 112(1)(k), 112(2)(k) and 112(3)(k). FIG. 6 illustrates the connection queue size as the dotted region for each queue. For each mask 124, the connection queue size for each queue may be compared to the thresholds 112. Context vectors 128(0), 128(1) and 128(2) comprise binary context elements indicating whether the queue size surpassed the thresholds from each of the masks 124(0), 124(1) and 124(2). Thus, context vector 128(0) is equal to [1, 1, 1, 0] because the queue sizes for $Q_0$, $Q_1$ and $Q_2$ exceed the initial thresholds 112(0)(0), 112(1)(0) and 112(2)(0), while the queue size for $Q_3$ does not exceed the initial threshold 112(3)(0). Similarly, context vector 128(1) is equal to [1, 0, 1, 0] because the queue sizes for $Q_0$ and $Q_2$ exceeds the second thresholds 112(0)(0) and 112(2)(0), while the queue sizes for $Q_1$ and $Q_3$ does not exceed the second thresholds 112(1)(0) and 112(3)(0). Context vectors may thus reflect the traffic conditions of the queues. Contexts may be characterized by various resolutions. $C_0$, $C_1$, and $C_2$, for example, provide a set of coarse to fine queuing traffic information for progressive allocation weight refinement.

Figure 7:
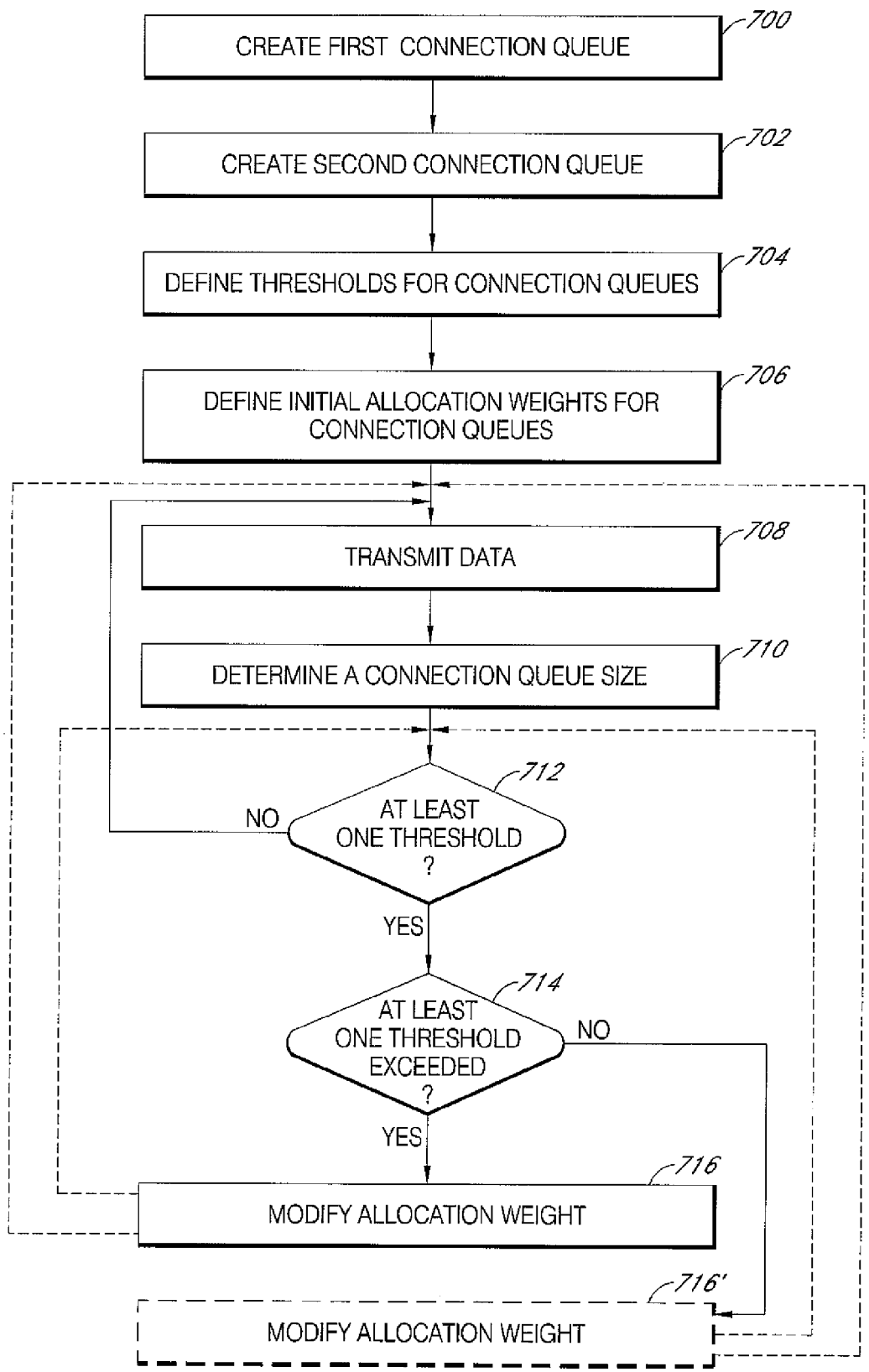
FIG. 7 is a flowchart showing a method of providing inter-processor communication on a channel between a first processor and a second processor.

FIG. 7 is a flowchart of describing one exemplary embodiment. Blocks 700, 702 and 704 correspond to blocks 500, 502 and 504 from the embodiment shown in FIG. 5 and described in the related text. At block 706, initial allocation weights are defined for the connection queues. Weights may be measured in terms of packets, which may be particularly suitable for networks having fixed packet sizes. Weights may be measured in terms of bandwidth (bytes), i.e. an amount of credit (bytes) for transmission. This approach may particularly suitable for networks of variable packet size. A weight vector may indicate the allocation weights defined for each of the connection queues:

$$w = \lfloor w_j \rfloor = [w_0 w_1 w_2 \ldots w_{N-1}];$$

wherein N is the number of connection queues. Higher allocation weights may indicate a higher priority queue. Weights may initially be assigned at least partially based upon the priority and/or buffer size of the connection queues.

Blocks 708 and 710 correspond to blocks 506 and 508 from the embodiment shown in FIG. 5 and described in the related text. At block 712, a connection queue size is compared to a threshold to determine whether the queue size for a connection queue does not exceed at least one threshold of that queue. In some embodiments, if no thresholds are exceeded, then no allocation weights are modified. In some embodiments, if all thresholds are exceeded, then no allocation weights are modified. If all thresholds are exceeded, the process may continue by returning to block 708.

If at least one threshold is not exceeded, the process may continue at block 714 with the determining of whether a queue size for a connection queue exceeds at least one threshold of that queue. In some embodiments, the thresholds examined in block 714 are from the same mask as the threshold not exceeded in block 712. Therefore, in some embodiments, an affirmative response to block 714 indicates a context vector comprises at least two non-equal values.

If at least one threshold is determined not to be exceeded in block 714, the process continues at block 716 with the modifying of an allocation weight. In some embodiments, the allocation weights are modified such that an allocation weight associated with the connection queue identified in block 714 for which the threshold was not exceeded is increased relative to the allocation weight associated with the connection queue identified in block 712 for which the threshold was exceeded. The allocation weights of one or more connection queues may be modified. Modification of an allocation weight may comprise adding an incrementing value to an existing allocation weight. The incrementing value may be a fixed value or may be obtained by a refinement value from a codebook.

If none of the thresholds are exceeded (block 714), the process may continue to optional block 716', wherein the allocation weights are modified. In some embodiments, allocation weights are modified whenever a queue size stops exceeding a threshold being analyzed. Refinement values may be added to allocation weights associated with all connection queues. The refinement values for the connection queues may be the same or different across queues. The refinement values may be extracted from a codebook. The addition of the refinement values may or may not modify the relative weighting between the queues.

The process may continue from block 714, 716 or 716' to return to block 712. For example, the measured queue sizes associated with a plurality of connection queues may be compared to thresholds from a different mask. By comparing the queue sizes to a plurality of thresholds, the allocation weights may be progressively refined. The process may also continue from block 714, 716 or 716' to return to block 708. For example, after the queue size has been compared to all thresholds for the connection queue, the process may continue at block 708. As another example, after the one or more context elements indicate that the queue size exceeds one or more thresholds, the process may continue at block 708.

Figure 8:
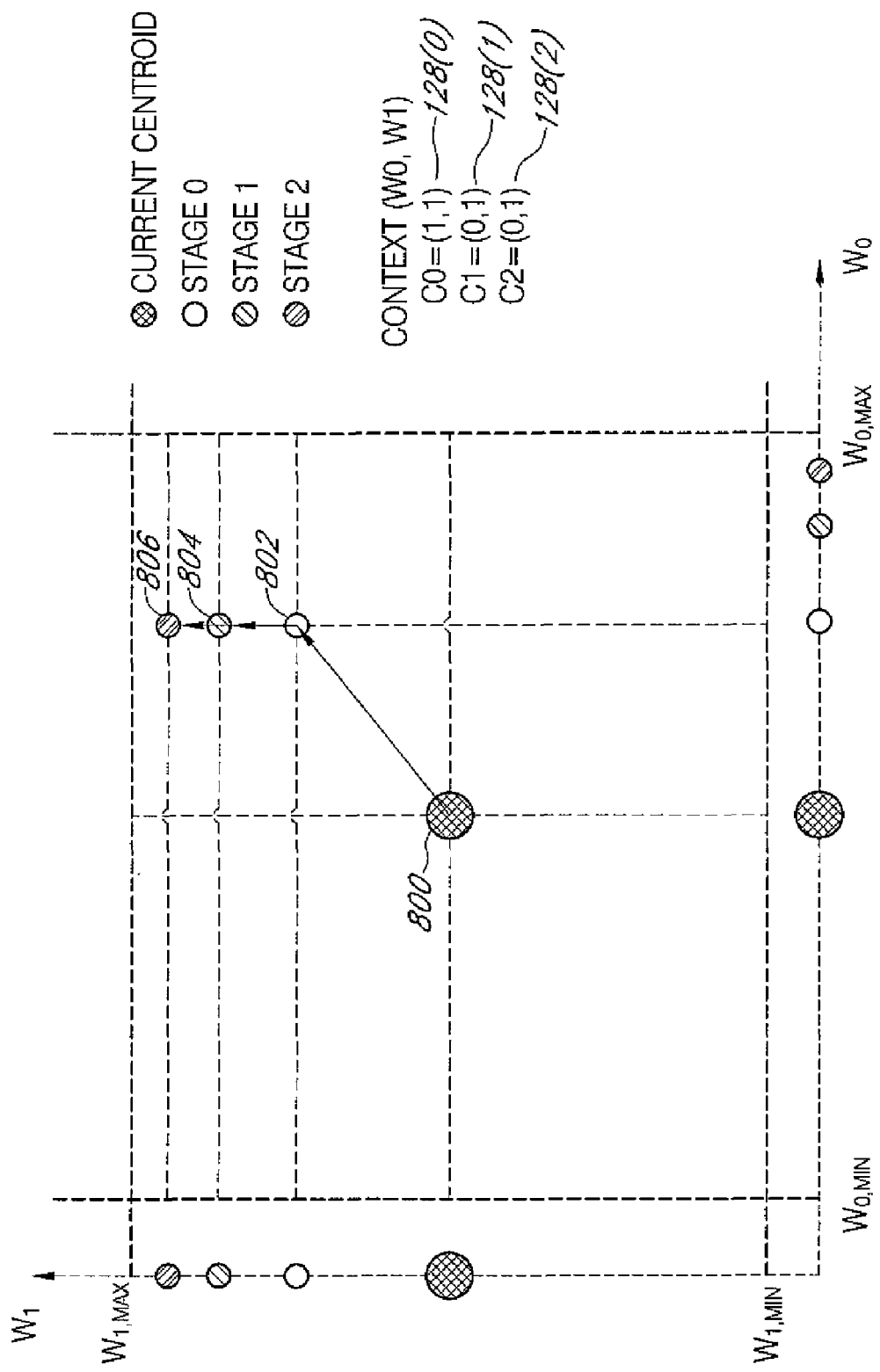
FIG. 8 illustrates a three-stage weight refinement for two connection queues.

FIG. 8 illustrates a three-stage weight refinement for two connection queues ($Q_0$ and $Q_1$) in a 2-dimensional vector space. The initial weight vector 800 comprises weights $w_0$ and $w_1$ associated with each connection queue and is located at the center of the highlighted vector space, which is defined by a maximum and minimum allocation weight of each dimension. A context vector corresponds to each stage, indicating whether an queue sizes of each of the two connection queues exceeds a threshold. The three contexts $C_0$, $C_1$ and $C_2$, in this example, are equal to [1,1], [0,1] and [0,1]. At stage 0, the $C_0$ [1,1] vector indicates that the queue size exceeds the initial thresholds for both connection queues. Therefore, both weights are increased with positive refinements to produce a first weight vector 802. At stage 1, the $C_1$ [0,1] vector indicates that the queue size by $Q_1$ further exceeds the second threshold. Thus, $w_1$ is further increased, but we remains the same to produce a second weight vector 804. Similarly, the $C_2$ [0,1] vector indicates that the queue size by $Q_1$ further exceeds the third threshold, so $w_1$ is again increased to produce a third weight vector 806. Notably, if a context value was 0 at a certain stage, indicating that the queue size is less than the current threshold, then all of the queue's context values in future stages would also be 0. Refinement may be complete until further data was transmitted.

Allocation weights may be modified by using a codebook. A single codebook or a plurality of codebooks may be used across stages of weight refinement. In some embodiments, a different codebook is associated with each stage of weight refinement. Notably, the total size of all codebooks can increase linearly rather exponentially as the stages of weight refinement increase. In some instances, codebook sizes may remain constant across stages. In some instances, codebook sizes may vary and/or may adapt across stages. A stage of weight refinement may correspond to analysis corresponding to a one mask or one context vector. In some embodiments, codebook comprises one or more codewords. A codeword is a refinement vector, which comprises one or more refinement values. The refinement values are the vector elements of the codeword. Codebooks of size L for each of the m stages may include refinement values for each of the N connection queues:

$$B_m = \{x_i; i=0,\ldots,L-1\}; m=0,1,2,\ldots,M-1;$$

$$x_i[r_{i,j}] = [r_{i,0}, r_{i,1}, r_{i,2}, \ldots, r_{i,N-1}]; j=0,1,2,\ldots,N-1;$$

Figure 9:
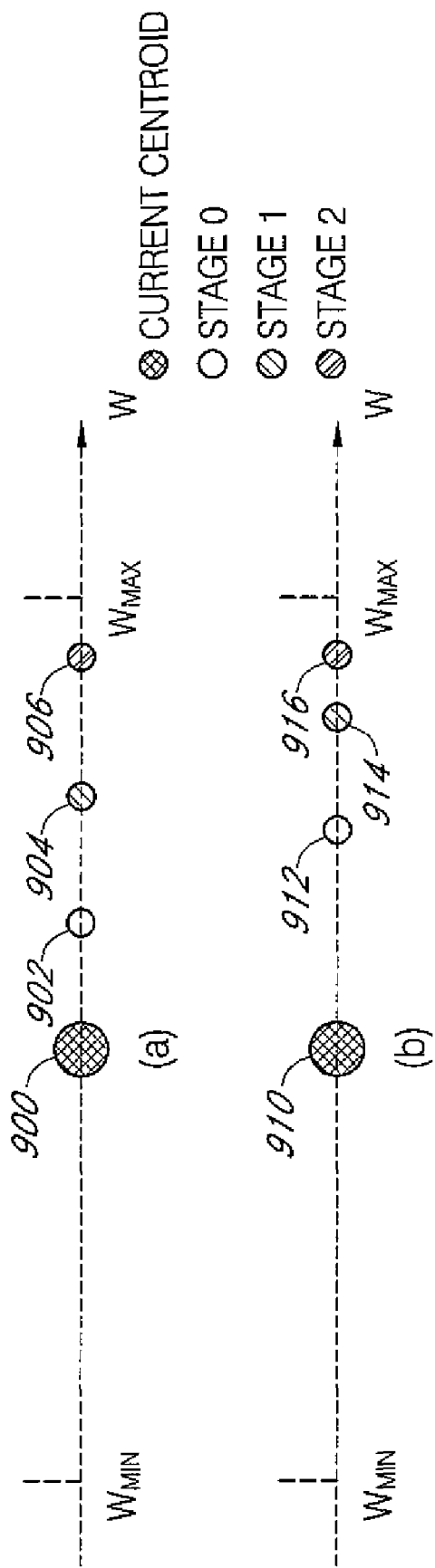
FIG. 9 illustrates a linear and an exponential refinement of an allocation weight.

Codebook values may be at least partially user-defined and/or trained, for example, by sample data. Codebook values may be at least partially determined based upon one or more of queue priority, a minimum allocation scheduling weight, a maximum allocation scheduling weight, a threshold, queue buffer size, threshold design model (e.g., linear or exponential model), and hierarchical structure of the scheduler (e.g., number of stages). Scalar- or vector- (e.g. LBG method) based methods may be used for codebook design. FIG. 9 shows a linear weight refinement process (top) and an exponential weight refinement process (bottom). For linear weight refinement, a refinement value associated with a connection queue may linearly vary across refinement stages. Thus, the differences between weights associated with consecutive stages (weights 900 and 902, weights 902 and 904, weights 904 and 906 and weights 906 and 908) do not depend on the refinement stage. For exponential weight refinement, the refinement value may exponentially vary across refinement stages. Thus, the differences between weights associated with consecutive stages (weights 910 and 912, weights 912 and 914, weights 914 and 916 and weights 916 and 918) depend on the refinement stage. In some instances, the refinement value decreases during later refinement stages, while in other instances it increases.

Figure 10:
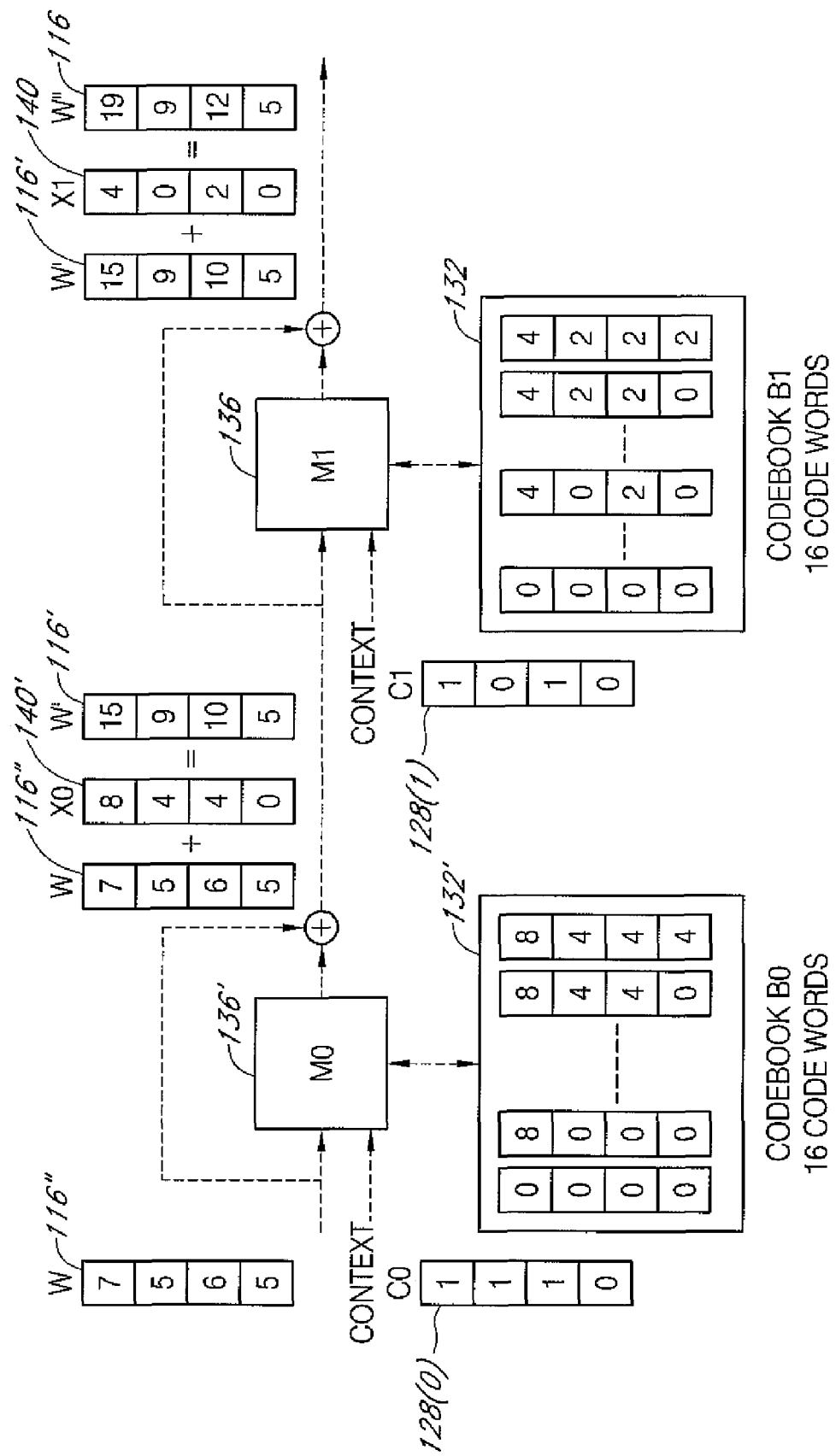
FIG. 10 illustrates a two-stage example of allocation weight refinement.

FIG. 10 illustrates an example of weight refinement with two stages and four connection queues. Codebooks 132' and 132 are associated with the first and second stage of refinement, respectively. The initial weights 116" for the four connection queues are set as [7, 5, 6, 5]. The first-stage context vector 128(0) is equal to [1, 1, 1, 0], indicating that the queue sizes of connection queues $Q_0$, $Q_1$, and $Q_2$ but not $Q_3$ exceeded initial thresholds. At an initial weight adjusting module 136', a refinement vector 140' with refinement values [8, 4, 4, 0] is selected from the codebook 132' and added to the initial weights 116" to produce a first-modified weight vector 116'. In the second stage, the context vector 128(1) is [1, 0, 1, 0], indicating that queue sizes of $Q_0$ and $Q_2$ further exceed a second threshold. At a second weight adjusting module 136, a second refinement vector 140 with refinement values [4, 0, 2, 0] is selected from the codebook 132 and added to the first-modified-weight vector 116' to produce a second-modified weight vector 116. Further stages may proceed in a similar manner. Therefore, the allocation weights are progressively refined based upon the context vectors. The look-up process associated with the codebooks may reduce the computational complexity as compared to other methods. In some instances, the values within the codebooks may be at least partially dynamically defined, thereby reducing or eliminating the need to store pre-computed codebooks in memory.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A multi-stage computer-implemented method of allocating bandwidth on a datapath between a first processor and a second processor, the method comprising:
   providing an allocation weight for each of a plurality of connection queues, wherein each of the connection queues is configured to transmit data across the datapath from the first processor to the second processor;
   generating a plurality of codebooks, wherein each of the codebooks corresponds to a stage of weight refinement;
   modifying an allocation weight in a plurality of stages, wherein the modifying for each stage comprises determining weight refinement values from a codebook associated with the stage from the plurality of codebooks, and wherein modifying for each stage further comprises assigning a new allocation weight based on the determined weight refinement values and the provided allocated weights.

2. The method of claim 1, further comprising:
   defining an associated threshold with each stage for each of the plurality of connection queues; and
   determining, for each stage, a context vector comprising a plurality of context elements associated with each of one or more connection queues selected from the plurality of connection queues, each context element being indicative of whether the size of the connection queue exceeds its associated threshold with the stage,
   wherein the determining of weight refinement values comprises selecting weight refinement values from a plurality of weight refinement values from the codebook based at least partly upon the context vector.

3. The method of claim 2, further comprising repeating the defining of the thresholds, the determining of the context vectors, and the modifying of the allocation weights.

4. The method of claim 2, wherein the context elements comprise binary numbers.

5. The method of claim 2, wherein the context vector is represented by a single number.

6. A computer-implemented method of allocating bandwidth in a datapath between a first processor and a second processor, the method comprising:
   defining an associated threshold for each of a plurality of connection queues, wherein each of the plurality of connection queues is configured to transmit data across the datapath between the first processor and the second processor;
   determining a context vector associated with one or more connection queues selected from the connection queues, wherein each context element corresponds to a connection queue and is indicative of whether the size of its corresponding connection queue exceeds its associated threshold;
   assigning allocation weights to the selected connection queues based at least partly upon the determined context vector;
   determining a second context vector associated with the one or more connection queues selected from the connection queues, wherein each second context element of the second context vector corresponds to a connection queue and is indicative of whether the size of its corresponding connection queue exceeds a second associated threshold; and
   assigning allocation weights to the selected connection queues based at least partly upon the determined second context vector.

7. The method of claim 6, wherein assigning of allocation weights to the selected connection queues comprises modifying weights assigned to the selected connection queues.

8. The method of claim 7, wherein modifying weights assigned to the selected connection queues comprises accessing a codebook based at least partially on the determined context vector.

9. The method of claim 8, wherein the codebook comprises a plurality of codewords.

10. The method of claim 9, wherein the codewords comprise a plurality of weight refinement values.

11. The method of claim 6, further comprising preferentially allocating bandwidth to connection queues with high allocation weight assignments.

12. The method of claim 6, wherein the selected connection queues comprises a selection of all of the connection queues.

13. A computer-implemented method of transmitting data from a processor having a data path configured to transmit data from the processor, the method comprising:
   creating within the data path a plurality of connection queues, each connection queue being configured to transmit data from the processor;
   defining a first associated threshold for each of the connection queues, wherein the first associated threshold is indicative of an amount of data awaiting transmission;
   defining a second associated threshold for each of the plurality of connection queues, wherein the second associated threshold is indicative of an amount of data awaiting transmission;
   comparing the size of each connection queue to its first associated threshold; and
   increasing a first allocation weight for each of the plurality of connection queues for which the size of the connection queue exceeds its associated threshold;
   comparing the size of each connection queue to its second associated threshold; and
   further increasing the first allocation weight for each of the plurality of connection queues for which the size of the connection queue and exceeds its second associated threshold.

14. The method of claim 13, wherein the determining the first allocation weight comprises modifying an initial weight based upon a refinement value from a codebook, wherein said refinement value is identified based upon the comparison of the size of the connection queue and its associated threshold.

15. The method of claim 13, further comprising:
   identifying an exceeding connection queue from the plurality of connection queues, for which the size of the exceeding connection queue exceeds its first associated threshold;
   identifying a non-exceeding connection queue from the plurality of connection queues, for which the size of the non-exceeding connection queue does not exceed its first associated threshold; and
   modifying an initial weight of the exceeding connection queue with respect to the initial weight of the non-exceeding connection queue.

16. The method of claim 13, wherein a priority is assigned to each connection queue, and wherein the first associated thresholds are inversely correlated with the priorities, such that a small first associated threshold is associated with a connection queue assigned a high priority.

17. The method of claim 13, further comprising allocating a bandwidth of the data path based upon the first weight.

18. A system for sharing data in a multi-processor environment comprising:
- a processor; and
- a data path associated with the processor, the data path having a fixed bandwidth comprising a plurality of connection queues defined therein, wherein the bandwidth is allocated among the connection queues based on allocation weights assigned to each of the connection queues, which are at least partly determined based upon comparing thresholds associated with each of the connection queues to a size of the connection queues;
- a plurality of codebooks, wherein each of the codebooks corresponds to a stage of weight refinement and wherein the codebooks used to determine a modification of allocation weight in a plurality of stages, wherein the modification for each stage is based on weight refinement values generated from the codebook associated with the stage, and wherein the modification for each stage comprises a new allocation weight.

19. The system of claim 18, wherein a plurality of thresholds are associated with each of the connection queues and wherein the plurality of thresholds are compared to the sizes of the respective connection queues.

20. The system of claim 18, wherein the weight assigned to a first connection queue of the plurality of connection queues increases relative to the weight assigned to a second connection queue of the plurality of connection queues upon determination that the size of the first connection queue does exceed a threshold associated with the first connection queue and that the size of the second connection queue does not exceed a threshold associated with the second connection queue.

21. The system of claim 18, wherein the allocation weights are also partly determined by one or more of the priorities of the connection queues, the sizes of the connection queues and initial allocation weights.

* * * * *